(12) United States Patent
Cap et al.

(10) Patent No.: US 8,246,786 B2
(45) Date of Patent: Aug. 21, 2012

(54) SOLAR DESALINIZATION PLANT

(75) Inventors: Daniel P. Cap, Chatsworth, CA (US); Alan V. von Arx, Northridge, CA (US)

(73) Assignee: Pratt & Whitney Rocketdyne, Inc., Canoga Park, CA (US)

( * ) Notice: Subject to any disclaimer, the term of this patent is extended or adjusted under 35 U.S.C. 154(b) by 256 days.

(21) Appl. No.: 12/553,372

(22) Filed: Sep. 3, 2009

(65) Prior Publication Data

US 2011/0048006 A1 Mar. 3, 2011

(51) Int. Cl.
*B01D 1/28* (2006.01)
*B01D 3/10* (2006.01)

(52) U.S. Cl. ....... 202/82; 203/10; 203/DIG. 1; 159/903; 159/DIG. 39

(58) Field of Classification Search .................. 202/180, 202/159; 203/10, 11, 40, 41, 88, DIG. 1; 60/648, 641.5, 641.9; 159/17.1, 19, 20.1, 159/903

See application file for complete search history.

(56) References Cited

U.S. PATENT DOCUMENTS

| | | | | |
|---|---|---|---|---|
| 1,927,649 A * | 9/1933 | Noack | | 122/31.1 |
| 3,300,393 A * | 1/1967 | Fisher | | 203/10 |
| 3,928,145 A * | 12/1975 | Othmer | | 203/11 |
| 4,110,174 A * | 8/1978 | Carson | | 203/11 |
| 4,111,810 A * | 9/1978 | Arai et al. | | 210/653 |
| 4,338,922 A * | 7/1982 | Moore | | 126/714 |
| 4,438,630 A * | 3/1984 | Rowe | | 60/676 |
| 4,595,459 A | 6/1986 | Kusakawa et al. | | |
| 4,921,580 A | 5/1990 | Martes et al. | | |
| 4,959,127 A | 9/1990 | Michna | | |
| 5,053,110 A | 10/1991 | Deutsch | | |
| 5,064,505 A | 11/1991 | Borgren | | |
| 5,198,076 A | 3/1993 | Borgren | | |
| 5,346,592 A | 9/1994 | Madani | | |
| 5,395,070 A * | 3/1995 | Stirbl et al. | | 244/2 |
| 5,405,503 A * | 4/1995 | Simpson et al. | | 203/10 |
| 5,468,340 A * | 11/1995 | Gupta et al. | | 216/67 |
| 5,582,690 A | 12/1996 | Weinberger et al. | | |
| 5,593,549 A | 1/1997 | Stirbl et al. | | |
| 5,645,693 A * | 7/1997 | Gode | | 202/173 |
| 5,925,223 A | 7/1999 | Simpson et al. | | |
| 6,083,382 A | 7/2000 | Bird | | |
| 6,185,940 B1 * | 2/2001 | Prueitt | | 60/649 |
| 6,391,205 B1 | 5/2002 | McGinnis | | |
| 6,607,639 B1 | 8/2003 | Longer | | |
| 6,663,750 B1 | 12/2003 | Coon | | |

(Continued)

FOREIGN PATENT DOCUMENTS

DE 2510168 9/1976

(Continued)

OTHER PUBLICATIONS

Brauch, H.G., "Potential of Solar Thermal Dealination to Defuse Water as a Conflict Issue in the Middle East", University of Berlin.*

(Continued)

*Primary Examiner* — Duane Smith
*Assistant Examiner* — Patrick McCarty
(74) *Attorney, Agent, or Firm* — Carlson, Gaskey & Olds PC

(57) ABSTRACT

A desalinization plant and process utilizes solar radiation to produce steam from seawater which is then used to generate freshwater and electricity.

9 Claims, 2 Drawing Sheets

U.S. PATENT DOCUMENTS

| | | | |
|---|---|---|---|
| 7,067,044 | B1 | 6/2006 | Coon |
| 7,459,064 | B2 | 12/2008 | Anderson |
| 7,525,214 | B2 | 4/2009 | Atilano Medina et al. |
| 7,527,711 | B2 | 5/2009 | Ciudaj |
| 2002/0067753 | A1 | 6/2002 | Ullman et al. |
| 2004/0072040 | A1 | 4/2004 | Duffy et al. |
| 2004/0099261 | A1* | 5/2004 | Litwin .................. 126/638 |
| 2004/0205032 | A1 | 10/2004 | Routtenberg et al. |
| 2005/0109394 | A1 | 5/2005 | Anderson |
| 2011/0048921 | A1* | 3/2011 | Cap et al. .................. 203/10 |

FOREIGN PATENT DOCUMENTS

| | | |
|---|---|---|
| DE | 10151904 | 5/2003 |
| EP | 1873397 | 1/2008 |
| EP | 1982954 | 10/2008 |

OTHER PUBLICATIONS

Garcia-Rodriguez, L., Delgado-Torres, A., "Solar-powered Rankine cycles for fresh water production", Desalination, vol. 212 pp. 319-327, Elsevier 2007.* http://www.energy.ca.gov/sitingcases/solartwo/index.html, SES Solar Two Project.

The Solar Project, http://en.wikipedia.orgiwiki/The_Solar_Project.

International Search Report and Written Opinion dated Dec. 23, 2010.

International Search Report and Written Opinion dated Mar. 15, 2012.

* cited by examiner

SOLAR DESALINIZATION PLANT

BACKGROUND

The present disclosure relates to a desalination system, and more particularly to a desalination system which utilizes concentrated solar power.

The need for freshwater is ever increasing and with areas of the world experiencing droughts, the economic impacts are becoming more severe. Desalination systems to supplement naturally available freshwater for increased residential, industrial, and farming applications throughout the world are of significant desirability.

SUMMARY

A desalinization plant according to an exemplary aspect of the present disclosure includes a heat exchanger operable to transfer energy from a heat transfer fluid to seawater within a seawater loop to extract steam from the seawater. A turbine is driven by the steam and a condenser downstream of the turbine produces freshwater from the steam.

A process for producing freshwater includes: absorbing thermal energy from a concentrated solar power system; transferring the energy into seawater; extracting steam from the seawater; driving a turbine with the steam; and condensing the steam downstream of the turbine to produce freshwater from the steam.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
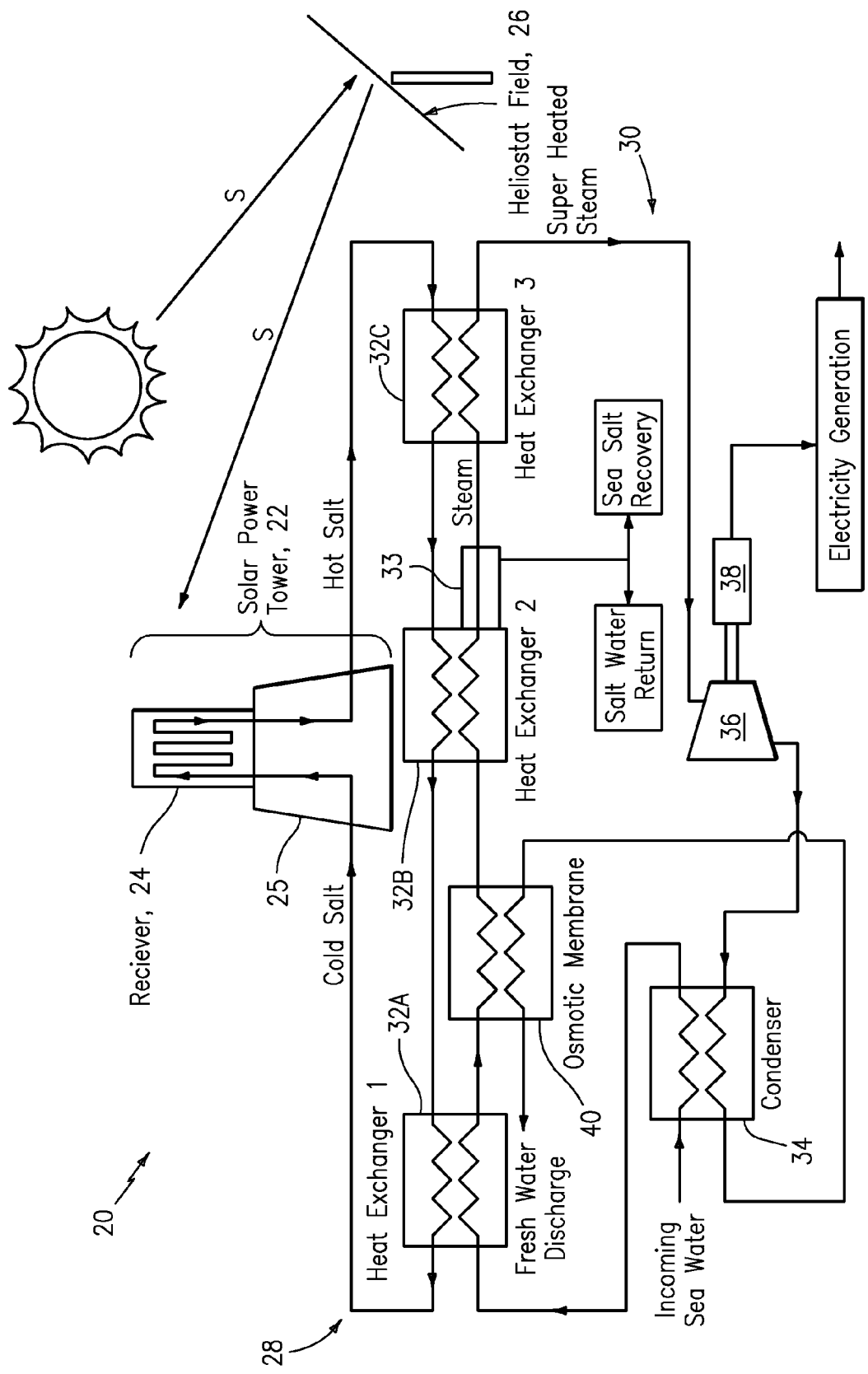
FIG. 1 is a schematic diagram of one non-limiting embodiment of a desalination plant.

Referring to FIG. 1, a desalinization plant 20 includes a concentrated solar power system 22 having a receiver 24 coupled to a tower structure 25 at a predetermined height above ground to receive solar radiation S from a multiple of sun-tracking heliostats 26. Although a power tower concentrated solar power system is illustrated in the disclosed, non-limiting embodiment, it should be understood that other concentrated solar power systems such as parabolic troughs and other systems inclusive of non-solar systems may alternatively be utilized. It should also be understood that although a particular component arrangement is disclosed in the schematically illustrated embodiment, other components arrangements may alternatively or additionally be utilized.

Molten salt or other heat transfer fluid is transported through a heated fluid loop 28 in communication with the concentrated solar power system 22. The heated fluid loop 28 may be a closed loop system separate from a seawater loop 30. A first heat exchanger 32A, a second heat exchanger 32B, and a third heat exchanger 32C provide for heat transfer between the heated fluid loop 28 and the seawater loop 30. It should be understood that although three heat exchangers are illustrated in the disclosed, non-limiting embodiment, any number of heat exchangers (FIG. 2) as well as other heat transfer systems may be utilized herewith. The seawater loop 30 generally includes the heat exchangers 32A, 32B, 32C, a condenser 34, and a steam turbine 36. The seawater loop 30 receives seawater from a sea, ocean or other point of origin for communication through the condenser 34.

In operation, the desalinization plant 20 utilizes the solar radiation S to produce steam from seawater which is then used to generate freshwater and electricity to power the desalinization plant 20. The heated fluid loop 28 is the main source of thermal energy. Solar radiation S is reflected by the heliostats 26 to the receiver 24. The reflected solar radiation S heats a heat transfer fluid which is communicated with the receiver 24 and the heat exchangers 32A, 32B, 32C. The receiver 24 commonly includes multiple tubes typically manufactured of highly temperature-resistant materials to transfer energy into the heat transfer fluid and thus the heat exchangers 32A, 32B, 32C.

The first heat exchanger 32A and the second heat exchanger 32B respectively heat and flash evaporate the seawater with, for example, a flash tank 33 downstream of the second heat exchanger 32B to produce steam. The sudden evaporation or "flashing" occurs when the hot seawater at some higher pressure is suddenly released to a lower pressure within the flash tank 33. The flash tank 33 may be integrated with the heat exchanger 32 and may be referred to as a flash tank heat exchanger system. It should be understood that various flash processes are well known and need not be described in detail herein.

The steam flashes off from the seawater and a more concentrated brine exits via the salt water return. The brine may be returned to the sea or a portion of the seawater may be used to produce sea salt as a byproduct.

From the flash tank 33, the steam is then superheated in the third heat exchanger 32C and utilized to power the steam turbine 36. Discharge from the steam turbine 36 may include cooler steam and condensed freshwater. The discharge is communicated through the condenser 34 for additional cooling, from which freshwater is discharged for downstream use.

The steam turbine 36 may also drive an electric generator 38. The electric generator 38 produces electricity which may be utilized to power the desalinization plant 20. Moreover, any additional excess electricity may be supplied to an electrical grid. It should be understood that various steam turbine and generator systems may be utilized herewith and need not be described in detail herein.

Alternatively, or in addition thereto, the seawater may be communicated across a selectively permeable osmotic membrane 40 downstream of the condenser 34. The osmotic membrane 40 allows unrestricted passage of water, but not the solute. The osmotic membrane 40 may also receive energy from the seawater heated by the first heat exchanger 32A to further improve efficiency. It should be understood that other arrangements which do not utilize the osmotic membrane 40 may alternative be provided.

Figure 2:
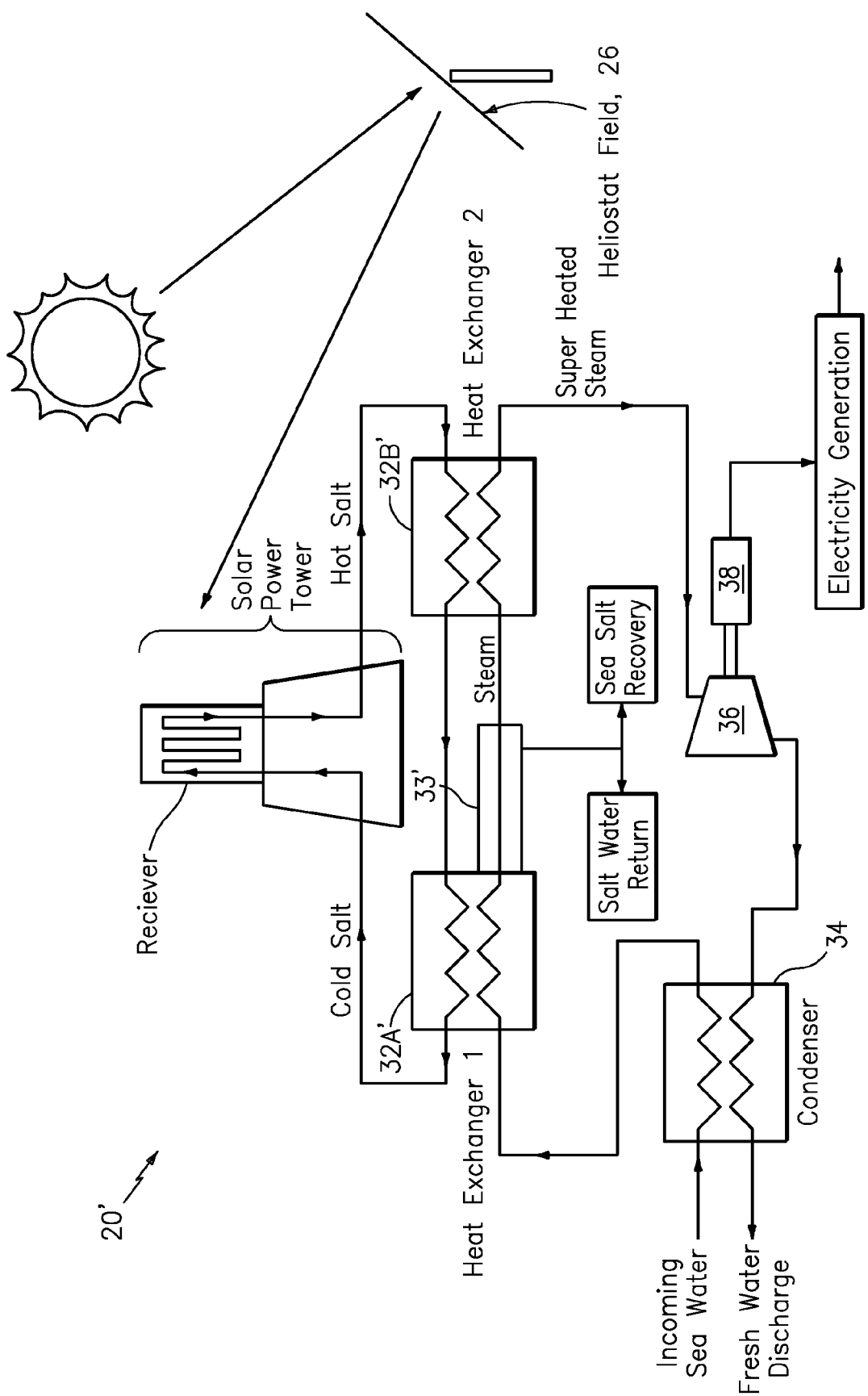
FIG. 2 is a schematic diagram of another non-limiting embodiment of a desalination plant.

Referring to FIG. 2, another desalinization plant 20' includes only a first and a second heat exchanger 32A' and 32B'. Downstream of the first heat exchanger 32A' the flash tank 33' separates the steam from the seawater such that the more concentrated brine exits via the salt water return. The steam is then superheated in the second heat exchanger 32B' to power the steam turbine 36.

Applicant has determined through modeling that a 40 MW-thermal desalinization plant 20 may produce a minimum of 30 million gallons of water per year.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present invention.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

What is claimed:

1. A desalinization plant comprising:
   a heated fluid loop which transports a heat transfer fluid, wherein the heated fluid loop is closed;
   a plurality of heat exchangers arranged to receive the heated fluid loop and that are operable to transfer energy from the heat transfer fluid to seawater within a seawater loop to extract steam from the seawater, wherein the plurality of heat exchangers are arranged to serially receive the heated fluid loop into a first one of the plurality of heat exchangers to a last one of the plurality of heat exchangers and serially receive the seawater loop into the last one of the plurality of heat exchangers to the first one of the plurality of heat exchangers;
   a turbine driven by the steam; and
   a condenser downstream of the turbine to produce freshwater from the steam.

2. The desalinization plant of claim 1, wherein the steam is extracted via flashing.

3. The desalinization plant of claim 1, further comprising an osmotic membrane to at least partially extract a solute from the seawater.

4. The desalinization plant of claim 1, wherein said heat transfer fluid receives energy from a concentrated solar power system.

5. The desalinization plant of claim 1, wherein said heat transfer fluid includes a molten salt.

6. The desalinization plant of claim 1, including an osmotic membrane arranged to receive output seawater as a first input from the first one of the plurality of heat exchangers and discharge the seawater to a second one of the plurality of heat exchangers and receive as a second input condensed seawater directly from the condenser.

7. The desalinization plant of claim 1, wherein the seawater loop includes a flash tank arranged downstream from one of the plurality of heat exchangers and upstream from another one of the plurality of heat exchangers.

8. A desalinization plant comprising:
   a concentrated solar power system;
   a fluid loop that transports a heat transfer fluid and is in communication with the concentrated solar power system, wherein the heated fluid loop is closed:
   a seawater loop which transports seawater;
   a plurality of heat exchangers arranged to serially receive the heated fluid loop into a first one of the plurality of heat exchangers to a last one of the plurality of heat exchangers and serially receive the seawater loop into the last one of the plurality of heat exchangers to the first one of the plurality of heat exchangers, the plurality of heat exchangers being operable to transfer energy from the heat transfer fluid to the seawater to extract steam;
   a turbine driven arranged to receive the steam; and
   a condenser downstream of the turbine to produce freshwater from the steam.

9. The desalinization plant of claim 8, wherein the seawater loop includes a flash tank arranged downstream from one of the plurality of heat exchangers and upstream from another one of the plurality of heat exchangers.

* * * * *